US008660437B1

(12) United States Patent
Blauvelt

(10) Patent No.: US 8,660,437 B1
(45) Date of Patent: Feb. 25, 2014

(54) MINIMIZING DISTORTION DUE TO WAVELENGTH DEPENDENT LOSS IN WDM OPTICAL NETWORKS

(75) Inventor: Henry A. Blauvelt, San Marino, CA (US)

(73) Assignee: Emcore Corporation, Albuquereque, NM (US)

( * ) Notice: Subject to any disclaimer, the term of this patent is extended or adjusted under 35 U.S.C. 154(b) by 283 days.

(21) Appl. No.: 13/035,392

(22) Filed: Feb. 25, 2011

Related U.S. Application Data

(60) Provisional application No. 61/416,787, filed on Nov. 24, 2010.

(51) Int. Cl.
*H04B 10/04* (2011.01)

(52) U.S. Cl.
USPC ........... 398/196; 398/194; 398/197; 398/162; 398/159; 398/136; 398/94; 398/95; 398/33; 398/38; 398/202; 398/208; 398/209

(58) Field of Classification Search
USPC ........... 398/90, 183, 192, 193, 194, 195, 196, 398/197, 198, 200, 201, 202, 208, 209, 214, 398/158, 159, 162, 135, 136, 137, 139, 33, 398/34, 37, 38, 30, 31, 32, 79, 81, 93, 94, 398/95
See application file for complete search history.

(56) References Cited

U.S. PATENT DOCUMENTS

| 5,920,414 | A * | 7/1999 | Miyachi et al. | 398/14 |
|---|---|---|---|---|
| 6,252,693 | B1 * | 6/2001 | Blauvelt | 398/194 |
| 6,707,550 | B1 * | 3/2004 | Georgis et al. | 356/326 |
| 6,906,804 | B2 * | 6/2005 | Einstein et al. | 356/484 |
| 7,162,164 | B2 * | 1/2007 | Brown et al. | 398/183 |
| 7,242,725 | B2 * | 7/2007 | Matsumoto et al. | 375/285 |
| 7,426,350 | B1 * | 9/2008 | Sun et al. | 398/193 |
| 7,636,522 | B2 * | 12/2009 | Nagarajan et al. | 398/79 |
| 7,773,885 | B2 * | 8/2010 | Weaver | 398/95 |
| 7,848,661 | B2 | 12/2010 | Iannelli | |
| 8,126,332 | B2 * | 2/2012 | Bainbridge et al. | 398/95 |
| 2003/0072333 | A1 * | 4/2003 | Jacobowitz et al. | 372/20 |
| 2003/0113118 | A1 * | 6/2003 | Bartur | 398/139 |
| 2007/0092262 | A1 * | 4/2007 | Bozarth et al. | 398/159 |
| 2007/0098417 | A1 * | 5/2007 | Peral et al. | 398/208 |
| 2009/0202255 | A1 * | 8/2009 | Chiappetta et al. | 398/159 |
| 2010/0299713 | A1 | 11/2010 | Salinger et al. | |

OTHER PUBLICATIONS

Data Sheet, "100GHz 8-Channel Dense Wavelength Division Multiplexer." AC Photonics, Inc., Santa Clara, CA., 2011.
Data Sheet, "SUPRALinkTM HWM 1100S-10E01." Harmonic Inc., Sunnyvale, CA., 2009.

* cited by examiner

*Primary Examiner* — Hanh Phan

(57) ABSTRACT

A fiber optic network reduces distortion present in modulated optical signals received at an optical receiver from an optical transmitter via a fiber optic link. The optical receiver analyzes a received modulated optical signal, where the wavelength of the received signal is periodically varied at the transmitter around a center wavelength over a wavelength range. Based on the analysis, the receiver generates a link transmission curve indicative of the optical power of the received signal over the wavelength range. The network disclosed herein subsequently uses the link transmission curve to reduce the distortion caused by misalignment between the operating wavelength of a transmitter laser and a peak power wavelength at the peak power of the link transmission curve. For example, the transmitter may adjust the laser operating wavelength based on a control signal received from the receiver and generated at the receiver based on the link transmission curve.

18 Claims, 5 Drawing Sheets

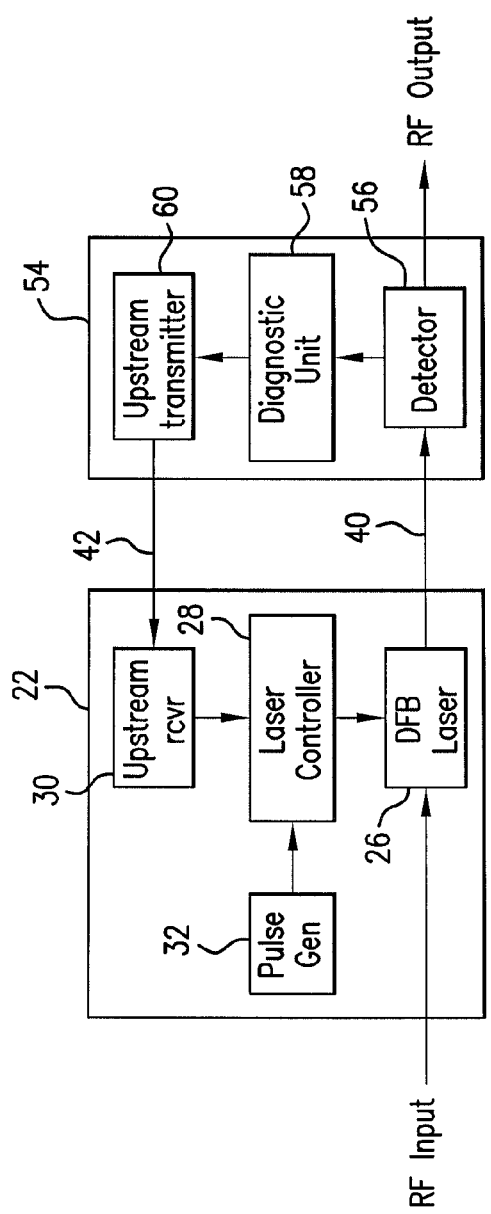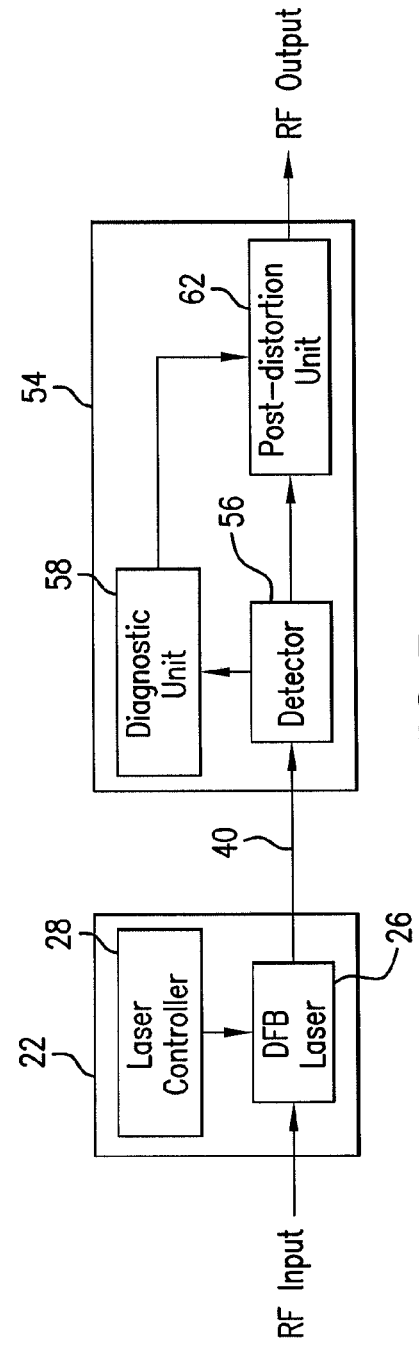

MINIMIZING DISTORTION DUE TO WAVELENGTH DEPENDENT LOSS IN WDM OPTICAL NETWORKS

RELATED APPLICATION

The present application claims priority to Provisional Patent Application Ser. No. 61/416,787, filed on Nov. 24, 2010, which is incorporated herein by reference in its entirety.

FIELD OF THE INVENTION

The invention described herein is generally directed to fiber optic networks, and more particularly to a method and apparatus for testing, evaluating, and adjusting the wavelength-dependent performance of components of such fiber optic networks.

BACKGROUND

Fiber optics networks are increasingly installed to replace copper wire systems for a wide variety of communication and entertainment applications, e.g., cable television, because optical fiber networks provide superior performance relative to copper wire systems. Further, wavelength division multiplexing (WDM) is also widely used with fiber optic networks to further increase the information carrying capacity of the networks. Optimizing the performance of WDM fiber optic networks, however, is challenging due to the precise wavelength requirements of WDM networks. While lasers emit light generally centered at a particular wavelength, the environmental temperature and/or age of a laser may cause the center wavelength to drift over time. Further, while the components used in WDM networks are manufactured for specific wavelengths, the manufacturing process of such components generally result in relatively significant variations in the wavelength associated with the transmission peak of such components. The effects of temperature, age, and manufacturing tolerances on the performance of WDM networks may manifest in an inability to sufficiently align the operating wavelength of an optical transmitter laser with a transmission peak of a link transmission curve defining the wavelength dependent performance of the optical network. Such misalignment generally modulates signals containing multiple frequencies, which causes additional signals to be formed at frequencies that are at the sum and/or difference of the original frequencies. Such intermodulation distortion undesirably degrades the performance of the WDM network. Thus, there remains a need for means to improve the performance of fiber optic networks, particularly WDM fiber optic networks.

SUMMARY

The invention disclosed herein reduces distortion to improve the performance of a fiber optic network configured to transmit optical signals between an optical transmitter and an optical receiver over a fiber optic link. To that end, a WDM optical communication network disclosed herein comprises an optical transmitter, a fiber optic link, and an optical receiver disposed remotely from the optical transmitter. The optical transmitter, which generates a modulated optical signal for transmission over the fiber optic link includes a first laser, a first input, and a controller. The first laser produces a first optical signal at a first wavelength corresponding to a first communication channel. The first input is coupled to the first laser for directly modulating the first laser with an RF signal to produce a first modulated optical signal. The controller is coupled to the first laser for periodically varying the first wavelength around a first center wavelength over a first wavelength range of less than 2.0 nm. The fiber optic link has opposing first and second ends, where the first end is coupled to an output of the optical transmitter. The optical receiver is coupled to the second end of the fiber optic link to receive and detect a received modulated optical signal. The optical receiver includes a detector and a processor coupled to the detector. The detector converts the received modulated optical signal into a corresponding modulated electrical signal. The processor analyzes the modulated electrical signal to determine the power of the received modulated optical signal as a function of time to generate data indicative of the optical power of the modulated optical signal as a function of the wavelength of the modulated optical signal, and computes a performance parameter of the received modulated optical signal.

An optical transmitter disclosed herein generates a modulated optical signal for transmission over a fiber optic link to a remote receiver. The optical transmitter comprises a first laser, an input, and a controller. The first laser produces a first optical signal at a first operating wavelength. The input is coupled to the laser for directly modulating the first laser with a first RF signal to produce a first modulated optical signal including a first amplitude modulated information-containing component and a first phase modulated component. The controller is coupled to the first laser for periodically varying the wavelength of the first laser around a first center wavelength over a wavelength range of less than 2.0 nm.

A receiver disclosed herein receives and detects a received modulated optical signal from a remote transmitter, the signal having a wavelength periodically varying in frequency over a wavelength interval of less than 2.0 nm around a center wavelength. The receiver comprises a detector and a processor. The detector converts the received modulated optical signal into a corresponding modulated electrical signal. The processor analyzes the modulated electrical signal to determine the power of the received modulated optical signal as a function of time to generate a link transmission curve indicative of the optical power of the modulated optical signal as a function of the wavelength of the optical signal, wherein the processor is configured to analyze the data in order to improve a performance parameter of the received modulated optical signal.

The present invention is not limited to the above features and advantages. Some implementations or embodiments may incorporate or implement fewer of the aspects or features noted in the foregoing summaries. Those skilled in the art will recognize additional features and advantages upon reading the following detailed description, and upon viewing the accompanying drawings.

BRIEF DESCRIPTION OF THE DRAWINGS

FIG. 4 illustrates a block diagram of an optical communication network according to one exemplary embodiment.

FIG. 5 illustrates a block diagram of an optical communication network according to another exemplary embodiment.

DETAILED DESCRIPTION

Figure 1:
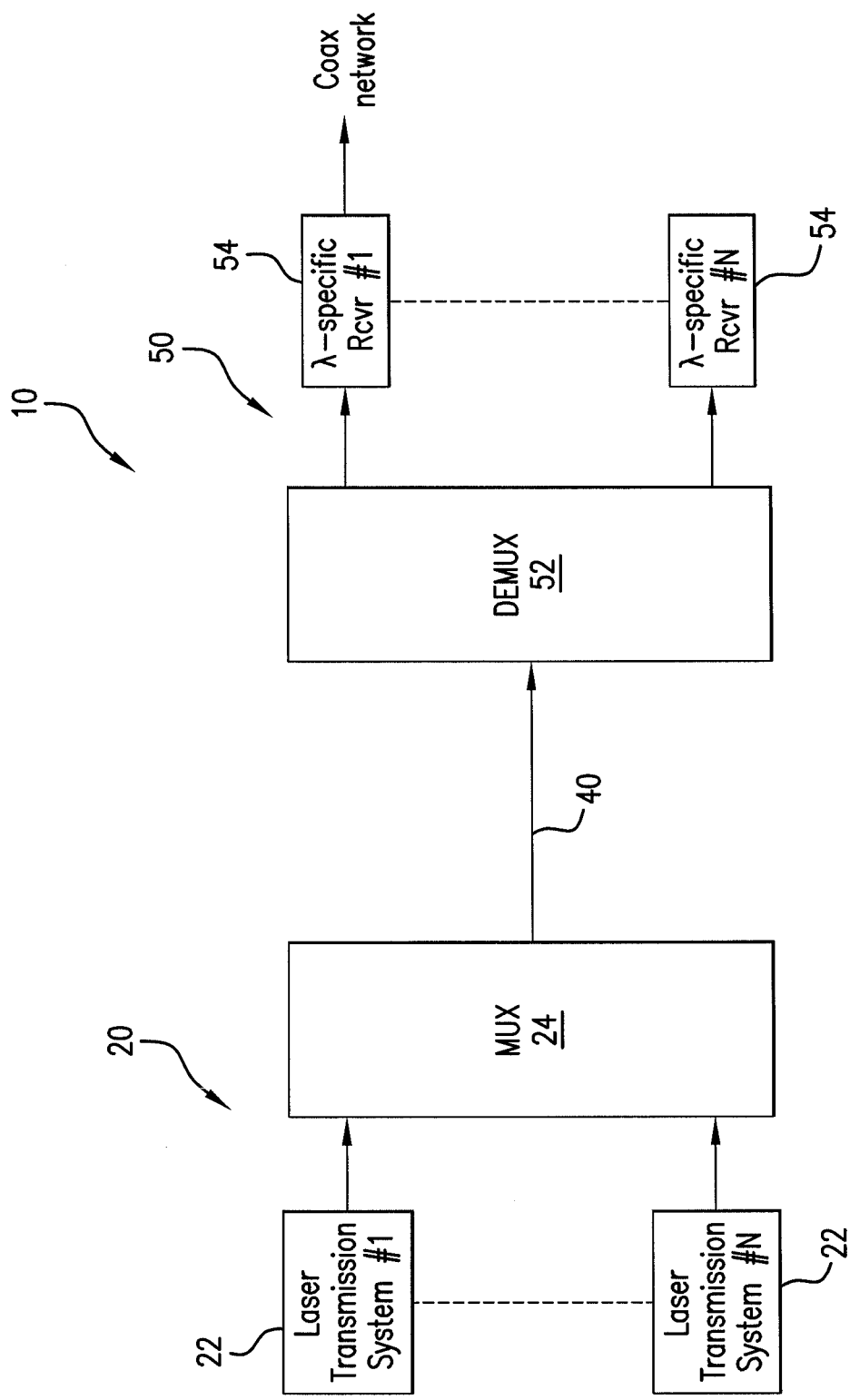
FIG. 1 illustrates a general block diagram for a fiber optic communication network.
Figure 2:
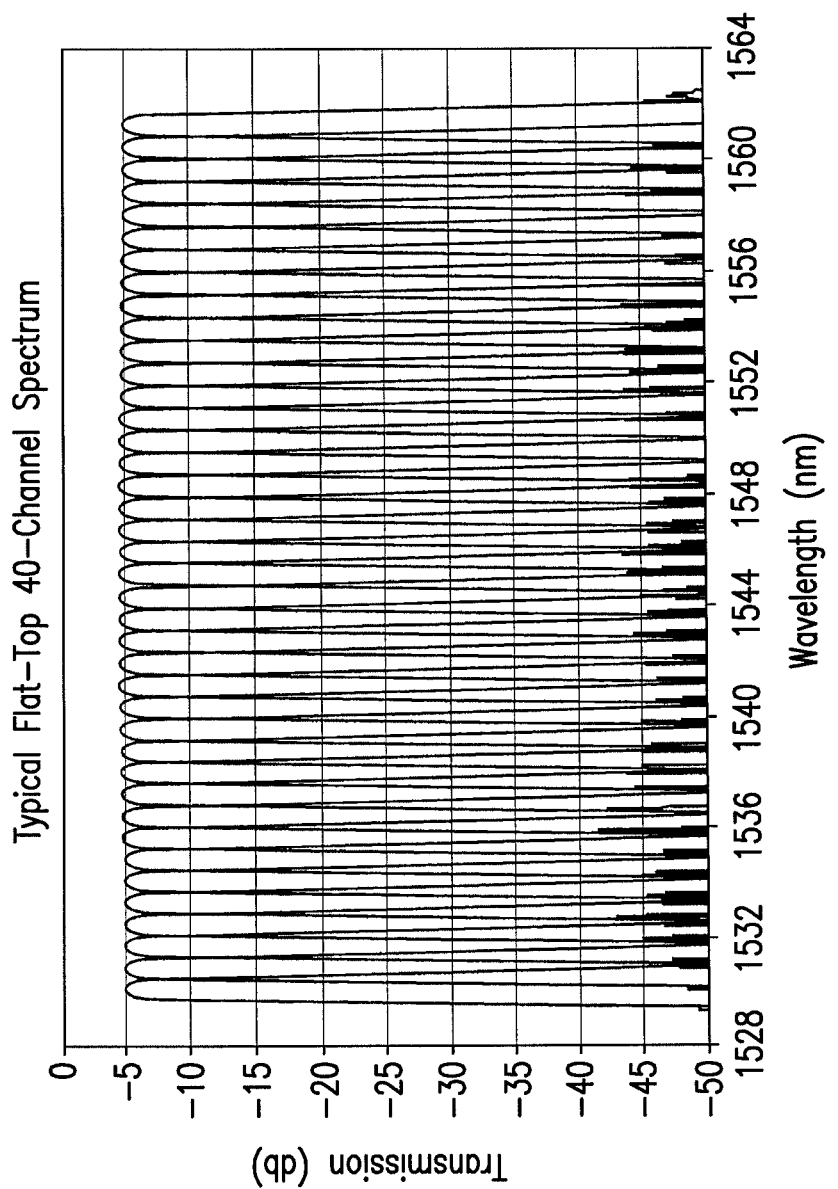
FIG. 2 illustrates an exemplary transmission power versus wavelength plot for a multi-wavelength optical network.

FIG. 1 illustrates an exemplary WDM fiber optic communication network 10 that may, for example, be used as part of a cable television (CATV) network. Network 10 comprises a WDM optical transmitter 20 communicatively coupled to an optical receiver 50 via a fiber optic link 40, which may comprise one or more fiber optic cables. Optical transmitter 20 includes a plurality of laser transmission systems 22 and a multiplexer 24. Each laser transmission system 22 directly modulates a laser, e.g., a distributed feedback (DFB) laser, to output an RF modulated optical signal centered at a corresponding operating wavelength, as described further herein. For example, optical transmitter 20 may include N=40 laser transmission systems 22, each of which outputs an RF modulated optical signal centered at a different operating wavelength so that the laser transmission systems 22 collectively output N=40 RF modulated optical signals centered at N=40 different operating wavelengths, as shown in FIG. 2. Multiplexer 24 combines the N wavelength-specific RF modulated optical signals to generate a multiplexed optical signal for transmission to the remote optical receiver 50 via the fiber optic link 40.

Optical receiver 50 comprises a demultiplexer 52 and a plurality of wavelength-specific receivers 54 that receive and process the multiplexed modulated optical signal. More particularly, demultiplexer 52 separates the received multiplexed modulated optical signal into a plurality of received modulated optical signals, each having a different wavelength and each corresponding to a different information-containing channel of the network 10. Each wavelength-specific receiver 54 processes a different one of the plurality of received modulated output signals output by the demultiplexer 52, as described further herein.

To reduce distortion when using a directly modulated DFB laser in a WDM network, the operating wavelengths of each laser transmission system 22 should be very close to the transmission peak of a corresponding link transmission curve, where each link transmission curve represents the power vs. wavelength characteristics of the fiber optic network for the corresponding wavelength, and generally includes the effects of at least the multiplexer 24, fiber optic link 40, and demultiplexer 52. While many components in the optical network 10 affect the link transmission curve, the multiplexer 24 and demultiplexer 52 may be one of the main sources for wavelength misalignment (assuming the laser wavelength stays constant). Thus, the following describes the misalignment problem in terms of the multiplexer/demultiplexer pair.

Figure 3:
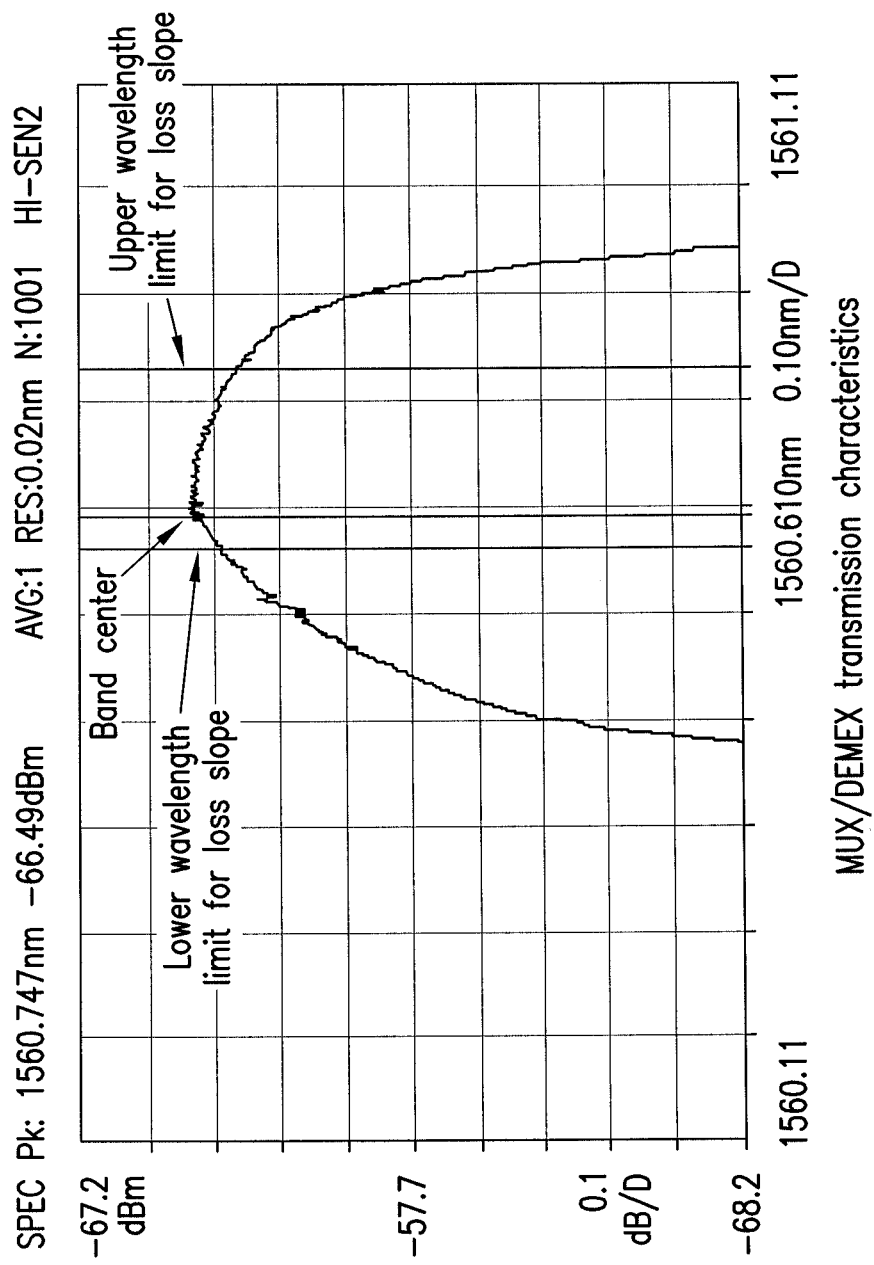
FIG. 3 illustrates an exemplary transmission curve for one wavelength used in the optical network.

FIG. 3 illustrates one exemplary link transmission curve for a typical pair of multiplexers and demultiplexers. The nominal center wavelength (1560.61 nm) of the ITU band and the wavelengths that correspond to the maximum desired loss slopes are indicated on FIG. 3. As shown therein, there is a relatively small wavelength tolerance between the band center and the lower wavelength limit, and the transmission peak of the transmission curve is slightly to the high wavelength side of the nominal center of the ITU band. When the operating wavelength of the laser does not align with the transmission peak, the wavelength dependent loss increases, which may result in unacceptably high levels of distortion, e.g., intermodulation distortion, which degrades the performance of the fiber optic network 10.

Conventional networks, such as those used in CATV networks, may simply set the laser temperature and bias current so that at the initial operation of the DFB laser, the operating wavelength is at one of the ITU standardized center wavelengths. This simple laser temperature and bias control generally results in operation near the transmission peaks of the corresponding transmission curves, but does not guarantee precise alignment due to variations in the manufacturing tolerances of the multiplexer 24 and demultiplexer 52. Further, such initial wavelength control does not address wavelength drift that may occur during the life of the laser.

Another more complicated and expensive conventional approach uses an external wavelength locker to monitor the wavelength of the laser and adjust the laser temperature and/or bias current as required to keep it precisely on a specific wavelength. This more complicated control option addresses laser wavelength drift, but does not guarantee operation at the transmission peak because it does not address the variations in the transmission peak caused by multiplexer and demultiplexer manufacturing tolerances.

The invention described herein reduces the distortion caused by misalignment between a laser operating wavelength and a transmission peak of a corresponding link transmission curve. In one embodiment, the optical transmitter 20 adjusts the operating wavelength of a laser in at least one of the laser transmission systems 22 responsive to a wavelength control signal received from the remote optical receiver 50 to shift the operating wavelength towards the transmission peak. In another embodiment, the optical receiver 50 uses a post-distortion unit to correct the distortion present in the received modulated optical signal. In both cases, diagnostics performed at the optical receiver 50 characterize the misalignment between the laser operating wavelength and the transmission peak, and generate a correction signal, e.g., a wavelength control signal to increase/decrease the laser operating wavelength, or a post-distortion signal to compensate for the distortion in the received signal, that reduces the wavelength dependent loss and/or distortion present in the optical signal received by the optical receiver 50.

FIG. 4 illustrates one exemplary embodiment of the fiber optic communication network 10 that uses feedback to control the operating wavelength of the laser, e.g., by controlling the laser operating wavelength responsive to a wavelength control signal provided by the remote optical receiver 50. For simplicity, FIG. 4 only illustrates one laser transmission system 22 communicatively coupled to the corresponding wavelength-specific receiver 54 via link 40. It will be appreciated, however, that the when the optical transmitter 20 and optical receiver 50 implement WDM operations, and therefore include multiple laser transmission systems 22 and wavelength-specific receivers 54, the respective laser transmission systems 22 and wavelength-specific receivers 54 will each include one or more of the elements shown in FIG. 4. For example, each laser transmission system 22 may include a DFB laser 26 and each wavelength-specific receiver 54 may include a detector 56. It will be appreciated that laser controller 28, upstream receiver 30, diagnostic unit 58, and/or upstream transmitter 60 may be individually implemented in separate laser transmission systems 22 and/or wavelength-specific receivers 54, or may alternatively be implemented in external components operatively coupled to the appropriate laser transmission systems 22 and/or wavelength-specific receivers 54. It will further be appreciated that one laser controller 28 may be used to control multiple lasers 26 in multiple laser transmission systems 22. Further, while FIG. 4 does not explicitly show the multiplexer 24 or demultiplexer 52, it will be appreciated that the multiplexer 24 and demultiplexer 52 are present as shown in FIG. 1 when the optical transmitter 20 and optical receiver 50 implement WDM operations.

The laser transmission system 22 of FIG. 4 includes a DFB laser 26, a laser controller 28, and an upstream receiver 30. The DFB laser 26 is modulated by an RF input to output a modulated optical signal at the operating wavelength of the laser 26. Laser controller 28 adjusts the operating wavelength of the laser by adjusting the temperature and/or bias of the laser 26. The laser controller 28 may adjust the operating wavelength responsive to a wavelength control signal received by the upstream receiver 30 from remote optical receiver 50. The optical transmitter 20 transmits the modulated (and generally multiplexed) optical signal output by the laser transmission system 22 to the corresponding wavelength-specific receiver 54 of the optical receiver 50 via the fiber optic link 40.

The wavelength-specific receiver 54 of FIG. 4 includes a detector 56, a diagnostic unit 58, and an upstream transmitter 60. The detector 56 processes the received modulated optical signal provided by fiber optic link 40 to generate a modulated electronic signal representative of the received modulated optical signal. Diagnostic unit 58 analyzes the modulated electrical signal to determine a performance parameter of the received modulated optical signal, e.g., a modulation error ratio, a distortion, etc.

The diagnostic unit 58 further works in conjunction with the laser controller 28 to generate the wavelength control signal. In one exemplary embodiment, the laser controller 28 dithers the laser operating wavelength according to some predetermined sequence or pattern. For example, generally, the laser controller 28 may dither the laser operating wavelength around a center wavelength over a wavelength range of less than 2.0 nm while controlling the optical power to be constant or to vary in some predetermined manner. The received modulated optical signal received by optical receiver 50 includes modulation related to the RF input signal. If there is wavelength dependent loss, the received modulated optical signal also includes modulation related to the wavelength dithering. Diagnostic unit 58 analyzes the modulation in the corresponding modulated electrical signal due to the wavelength dithering to determine link transmission data for the corresponding wavelength. For example, the diagnostic unit 58 may analyze the modulated electrical signal to determine the power of the received modulated optical signal as a function of time to determine a link transmission curve, e.g., the optical power of the received modulated optical signal as a function of the wavelength of the optical signal. Based on this analysis, diagnostic unit 58 generates the wavelength control signal. For example, diagnostic unit 58 may analyze the slope of the wavelength dependent loss at the nominal operating wavelength. The closer the nominal laser operating wavelength is to the peak power wavelength of the transmission curve, the closer the wavelength loss slope is to zero. Based on the loss slope, the diagnostic unit 58 generates the wavelength control signal to instruct the laser controller 28 to increase or decrease the nominal operating wavelength. In some embodiments, the wavelength control signal may comprise the wavelength loss slope, and the laser controller 28 may adjust the nominal operating wavelength of the laser 26 based on the wavelength loss slope. In other embodiments, the diagnostic unit 58 may generate a wavelength control signal that provides an explicit increase or decrease command or an explicit wavelength value to instruct the laser controller 28 to adjust the nominal operating wavelength accordingly. In any event, the diagnostic unit 58 provides the wavelength control signal to the upstream transmitter 60. Upstream transmitter 60 transmits the wavelength control signal to the upstream receiver 30 via a communications interface 42 there between.

Because the intended operating wavelength is near a point with no loss slope, the corresponding signal may have a low amplitude. To aid in the analysis, therefore, laser transmission system 22 may further include a pulse generator 32 that assists the laser controller 28 in adding additional signals to the laser output, e.g., timing signals. The timing signals could be in the form of short pulses in the laser bias, but should not include radio frequencies within the operating frequency range of the optical transmitter 20, which is typically between 50 MHz and 1000 MHz for CATV networks. The diagnostic unit 58 may use the timing signals to better identify the modulation due to the wavelength dithering.

In some cases, it may be desirable to target a specific level of wavelength dependent loss instead of zero, e.g., when the optical network includes optical amplifiers. In these cases, the distortion of an optical signal transmitted through an optical amplifier may be different from that predicted by a measurement of wavelength dependent gain done with a slow wavelength scan. By targeting a specific non-zero wavelength dependent loss, the diagnostic unit 58 accounts for the optical amplifier distortion in a way that does not interfere with its ability to correct for distortion caused by wavelength misalignment.

In another embodiment, the diagnostic unit 58 generates the wavelength control signal by identifying the wavelength in a wide range of wavelengths having the peak power. For this embodiment, the laser controller 28 varies the wavelength over a wider range of wavelengths that likely contains the peak power wavelength. Diagnostic unit 58 analyzes the resulting modulated electrical signals to determine which wavelength is associated with the peak power. The diagnostic unit 58 in this case generates a wavelength control signal that generally identifies the peak power wavelength so that the laser controller 28 may adjust the nominal operating wavelength of the laser 26 to the peak power wavelength.

In still another embodiment, diagnostic unit 58 measures the distortion of the received modulated optical signal, e.g., based on the link transmission data and/or link transmission curve. Based on a comparison between the measured distortion and a distortion threshold, the diagnostic unit 58 generates the wavelength control signal. Alternatively, diagnostic unit 58 may generate a dispersion control signal, which is transmitted to the optical transmitter 20. The laser controller 28 subsequently adjusts the dispersion compensation of the optical transmitter 20 based on the received wavelength control signal or the received dispersion control signal.

In any event, laser controller 28 adjusts the operating wavelength of the laser 26 responsive to the received control signal by, e.g., varying the laser temperature and/or varying the laser bias current. The laser operating wavelength will normally be adjusted in the direction of decreasing loss. In so doing, laser controller 28 shifts the laser wavelength towards the transmission peak, which may or may not represent the overall maximum in the transmission curve, but will generally minimize the wavelength dependent loss.

It will be appreciated that when network 10 comprises a WDM network 10, the wavelength control signal may provide a wavelength adjustment indication for the lasers 26 in multiple laser transmission systems 22. In some embodiments, separate wavelength control signals are sent for separate laser transmission systems 22. In other embodiments, the wavelength control signal comprises a single signal with separate instructions for each laser transmission system 22. The laser controller 28, such as shown in laser transmission system 22 or such as used to generally control all laser transmission systems 22, adjusts the laser operating wavelength(s) according to the received wavelength control signal(s).

FIG. 5 illustrates another exemplary embodiment of the fiber optic communication network 10 where optical receiver 50 uses post-distortion to reduce the distortion present in the received modulated optical signal. For simplicity, FIG. 5 only illustrates one laser transmission system 22 communicatively coupled to the corresponding wavelength-specific receiver 54. It will be appreciated, however, that the when the optical transmitter 20 and optical receiver 50 implement WDM operations, and therefore comprise multiple laser transmission systems 22 and wavelength-specific receivers 54, the respective laser transmission systems 22 and wavelength-specific receivers 54 will each include one or more of the elements shown in FIG. 5, e.g., the laser 26 and detector 56, respectively. Further, while FIG. 5 does not explicitly show the multiplexer 24 or demultiplexer 52, it will be appreciated that the multiplexer 24 and demultiplexer 52 are present as shown in FIG. 1 when the optical transmitter 20 and optical receiver 50 implement WDM operations.

Figure 6:
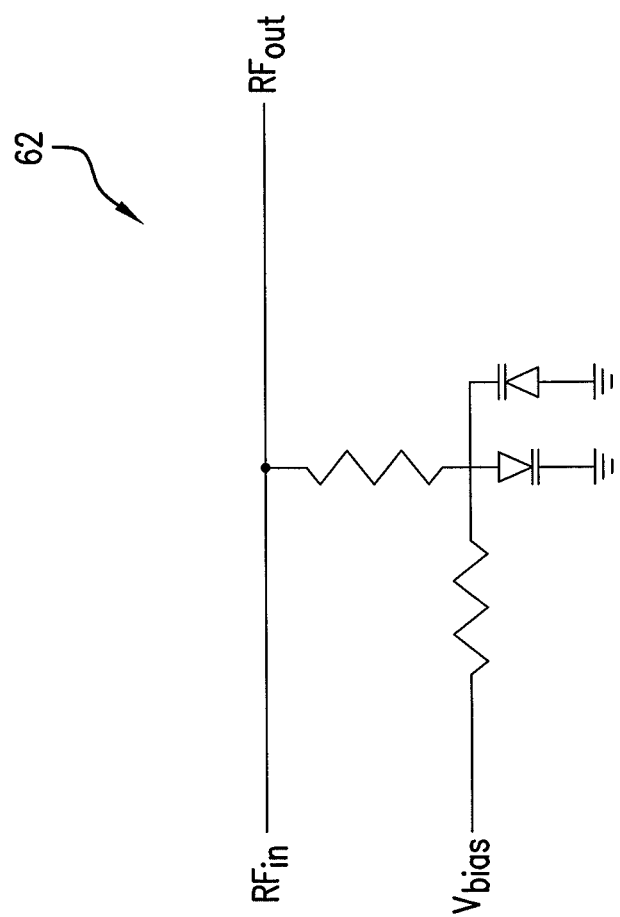
FIG. 6 illustrates an exemplary circuit diagram for the post-distortion unit of FIG. 5.

The embodiment shown in FIG. 5 is useful, for example, when it is impractical to have an uplink communication interface from the optical receiver 50 back to the optical transmitter 20, and/or when the optical transmitter 20 is serving multiple optical receivers 50 that each have a different wavelength dependent path loss. In this case, responsive to the wavelength dithering implemented by the laser controller 28 discussed above, the diagnostic unit 58 drives a post-distortion unit 62 in the wavelength-specific receiver 54 to cancel or otherwise reduce the distortion present in the received signal due to laser chirp and/or wavelength dependent loss through the optical network. FIG. 6 illustrates one exemplary post-distortion unit 62 that may be used to reduce the distortion, where diagnostic unit 58 determines the bias voltage Vbias based on the determined link transmission data that controls the post-distortion unit 62 to reduce the distortion.

In most cases, the wavelength control and/or distortion correction procedures described herein will only need to be done periodically over long time intervals as the transmission characteristics of the optical network 10 vary slowly, e.g., due to temperature changes, aging, etc. For example, the wavelength control and/or distortion correction procedures may be implemented once a quarter.

FIGS. 4 and 5 show embodiments that separately use wavelength control and post distortion. It will be appreciated, however, that the post distortion unit of FIG. 5 may be included with the wavelength control embodiment of FIG. 4.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

Without further analysis, from the foregoing others can, by applying current knowledge, readily adapt the present invention for various applications. Such adaptations should and are intended to be comprehended within the meaning and range of equivalence of the following claims.

What is claimed is:

1. A WDM optical communication network comprising:
   an optical transmitter for generating a modulated optical signal for transmission over a fiber optic link including:
      a first laser for producing a first optical signal at a first wavelength corresponding to a first communication channel;
      a first input coupled to the first laser for directly modulating the first laser with an RF signal to produce a first modulated optical signal; and
      a controller coupled to the first laser for periodically varying the first wavelength around a first center wavelength over a first wavelength range of less than 2.0 nm;
   a fiber optic link having opposing first and second ends, said first end coupled to an output of the optical transmitter; and
   an optical receiver disposed remotely from the transmitter and coupled to the second end of the fiber optic link to receive and detect a received modulated optical signal, said receiver including:
      a detector for converting the received modulated optical signal into a corresponding modulated electrical signal;
      a processor coupled to the detector for analyzing the modulated electrical signal to determine, based on a plurality of signals transmitted by the optical transmitter and that vary around the center wavelength, a link transmission curve representing optical power versus wavelength, and for generating a wavelength control signal based on the link transmission curve; and
      a communications interface to transmit the wavelength control signal to the remote transmitter to shift an operating wavelength of the first laser toward a transmission peak of the link transmission curve.

2. The WDM optical communication network of claim 1 wherein the optical transmitter further comprises:
   a second laser for producing a second optical signal at a second wavelength corresponding to a second communication channel;
   a second input coupled to the second laser for directly modulating the second laser with a second RF signal to produce a second modulated optical signal;
   wherein the controller is further coupled to the second laser to periodically vary the second wavelength around a second center wavelength over a second wavelength range of less than 2.0 nm; and
   a multiplexer coupled to the first laser and the second laser to multiplex the first and second modulated optical signals to generate a multiplexed optical signal.

3. The WDM optical communication network of claim 2 wherein the receiver further comprises:

an input coupled to the second end of the fiber optic link for receiving the multiplexed optical signal from the remote transmitter; and a demultiplexer coupled to the input for separating the multiplexed optical signal into a plurality of received modulated optical signals, each having a different wavelength and each corresponding to a different information-containing channel, wherein the detector comprises a plurality of detectors, each coupled to a respective one of the plurality of modulated optical signals for converting each of the respective plurality of modulated optical signals into a corresponding modulated electrical signal representing the corresponding information-containing channel.

4. The WDM optical communication network of claim 3, wherein the link transmission curve characterizes the optical transmitter, optical receiver, and fiber optic link and has a transmission peak at least partially defined by the demultiplexer, and wherein an operating wavelength of the corresponding received modulated optical signal is offset from the transmission peak.

5. The WDM optical communication network of claim 4, wherein the offset results in a wavelength dependent power loss in the received modulated optical signal.

6. The WDM optical communication network of claim 2, wherein the multiplexer has a peak power wavelength at a transmission peak that is slightly offset from the first wavelength.

7. The WDM optical communication network of claim 6, wherein the link transmission curve characterizes the optical transmitter, optical receiver, and fiber optic link with respect to the first wavelength range and has a first transmission peak, wherein the first transmission peak is at least partially defined by the multiplexer, and wherein the first operating wavelength is offset from the first transmission peak.

8. The WDM optical communication network of claim 7 wherein the controller is further configured to adjust the first operating wavelength responsive to a wavelength control signal received from the remote receiver to shift the first operating wavelength towards the first transmission peak.

9. The WDM optical communication network of claim 8 wherein the wavelength control signal indicates whether the first operating wavelength should be incremented or decremented.

10. The WDM optical communication network of claim 1, wherein the controller controls the bias of the first laser so that the power output of the first laser is constant as the wavelength of the first laser varies.

11. The WDM optical communication network of claim 1 further comprising a pulse generator for applying a timing pulse to the bias of the first laser.

12. The WDM optical communication network of claim 1 wherein the processor analyzes a slope of a wavelength dependent loss and, based on the slope, generates the wavelength control signal to shift the operating wavelength of the laser in the remote transmitter toward the transmission peak of the link transmission curve.

13. A receiver for receiving and detecting a received modulated optical signal from a remote transmitter, the received modulated optical signal having a wavelength periodically varying in frequency over a wavelength interval of less than 2.0 nm around a center wavelength, the receiver comprising:

a detector for converting the received modulated optical signal into a corresponding modulated electrical signal;

a processor for analyzing the modulated electrical signal to determine the power of the received modulated optical signal as a function of time to generate a link transmission curve indicative of the optical power of the modulated optical signal as a function of the wavelength of the optical signal, wherein the processor is configured to generate a wavelength control signal based on the link transmission curve in order to improve a performance parameter of the received modulated optical signal; and a communications interface to transmit the wavelength control signal to the remote transmitter to shift an operating wavelength of a laser in the remote transmitter toward a transmission peak of the link transmission curve.

14. The receiver of claim 13, further comprising an input for receiving the modulated optical signal from the remote transmitter; and a demultiplexer coupled to the input for separating the received modulated optical signal into a plurality of modulated optical signals each having a different wavelength and each corresponding to an information-containing channel, wherein the detector comprises a plurality of detectors each coupled to a respective one of the plurality of modulated optical signals for converting each of the respective ones of the plurality of modulated optical signals into a corresponding modulated electrical signal representing the corresponding information-containing channel.

15. The receiver of claim 14, wherein the link transmission curve characterizes the optical transmitter, optical receiver, and fiber optic link and has a transmission peak at least partially defined by the demultiplexer, and wherein an operating wavelength of the corresponding received modulated optical signal is offset from the transmission peak.

16. The receiver of claim 15, wherein the offset results in a wavelength dependent power loss in the received modulated optical signal.

17. The receiver of claim 13, wherein the performance parameter is a modulation error ratio, and wherein the processor is configured to generate a dispersion control signal which is transmitted to the remote transmitter for adjusting the dispersion compensation of the remote transmitter.

18. The receiver of claim 13 wherein the processor analyzes a slope of a wavelength dependent loss and, based on the slope, generates the wavelength control signal to shift the operating wavelength of the laser in the remote transmitter toward the transmission peak of the link transmission curve.

* * * * *